United States Patent
Wippel

(10) Patent No.: US 12,180,781 B2
(45) Date of Patent: Dec. 31, 2024

(54) METHOD AND DEVICE FOR FILLING HOLLOW PROFILE STRIPS

(71) Applicant: LISEC AUSTRIA GMBH, Seitenstetten (AT)

(72) Inventor: Rainer Wippel, Seitenstetten (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 457 days.

(21) Appl. No.: 17/626,362

(22) PCT Filed: Jul. 9, 2020

(86) PCT No.: PCT/EP2020/069353
§ 371 (c)(1),
(2) Date: Jan. 11, 2022

(87) PCT Pub. No.: WO2021/005149
PCT Pub. Date: Jan. 14, 2021

(65) Prior Publication Data
US 2022/0259919 A1 Aug. 18, 2022

(30) Foreign Application Priority Data

Jul. 11, 2019 (AT) .................................. A 255/2019

(51) Int. Cl.
*E06B 3/66* (2006.01)
*E06B 3/663* (2006.01)
(Continued)

(52) U.S. Cl.
CPC ...... *E06B 3/67317* (2013.01); *E06B 3/66314* (2013.01); *E06B 3/66361* (2013.01); *G01F 22/00* (2013.01)

(58) Field of Classification Search
CPC ............. E06B 3/67317; E06B 3/66314; E06B 3/66361; G01F 22/00
See application file for complete search history.

(56) References Cited

U.S. PATENT DOCUMENTS 4,279,065 A * 7/1981 Sernevi ............... E06B 3/67317
29/564.6
4,494,283 A * 1/1985 Lisec .................. E06B 3/67317
29/797

(Continued)

FOREIGN PATENT DOCUMENTS

AT 383 581 7/1987
AT 383 582 7/1987
(Continued)

OTHER PUBLICATIONS

Search Report for DE Application No. 2AA 255/2019—1 dated Jan. 14, 2020, 2 pages.
(Continued)

*Primary Examiner* — Kevin R Barss
(74) *Attorney, Agent, or Firm* — NIXON & VANDERHYE

(57) ABSTRACT

A device for filling spacer frames with hollow-section strips has a storage tank for free-flowing, hygroscopic fill material, such as a molecular sieve. A line that leads to the spacer frame to be filled extends from the storage tank and empties into a fill opening in the wall of the spacer frame. The amount of the fill material poured into the spacer frame is determined by the amount of the fill material removed from the storage tank being detected. The amount of the fill material removed from the storage tank is detected by measuring the travel of a piston that rests with pressure on the fill material in the storage tank. The degree of filling is verified by the amount of the fill material removed from the storage tank being compared to the preset amount of the fill material that is to be poured into the spacer frame.

16 Claims, 3 Drawing Sheets

(51) Int. Cl.
 *E06B 3/67* (2006.01)
 *E06B 3/673* (2006.01)
 *G01F 22/00* (2006.01)

(56) References Cited

U.S. PATENT DOCUMENTS

| | | | | |
|---|---|---|---|---|
| 4,670,954 | A | * | 6/1987 | Lisec ................. E06B 3/67317 |
| | | | | 29/455.1 |
| 4,947,537 | A | * | 8/1990 | Lisec ................. E06B 3/67317 |
| | | | | 29/527.4 |
| 5,253,683 | A | * | 10/1993 | Ekren ................ E06B 3/67317 |
| | | | | 29/527.1 |
| 5,390,406 | A | * | 2/1995 | Lisec ................. G01F 23/0007 |
| | | | | 29/709 |
| 5,613,394 | A | * | 3/1997 | Kawamura ............. B21D 9/16 |
| | | | | 72/369 |
| 2006/0037665 | A1 | * | 2/2006 | McGlinchy ......... E06B 3/67317 |
| | | | | 141/283 |
| 2013/0213508 | A1 | * | 8/2013 | Latimer ................ B65G 53/00 |
| | | | | 137/613 |
| 2015/0114480 | A1 | | 4/2015 | Hertel |
| 2017/0036787 | A1 | * | 2/2017 | Su ........................ B29C 64/321 |
| 2019/0184355 | A1 | * | 6/2019 | Omachi ................ B01F 23/235 |

FOREIGN PATENT DOCUMENTS

| | | |
|---|---|---|
| AT | 388 548 | 7/1989 |
| AT | 390 606 | 6/1990 |
| AT | 399 587 | 6/1995 |
| CH | 145675 A | 3/1931 |
| CN | 1877124 A | 12/2006 |
| DE | 37 10 694 | 10/1988 |
| DE | 9003568 | 5/1990 |
| DE | 44 02 450 | 9/1994 |
| DE | 44 38 125 | 2/1996 |
| DE | 10 2009 035 002 | 1/2011 |
| EP | 0 349 519 | 1/1990 |
| EP | 0 376 926 | 7/1990 |
| EP | 0 430 924 | 6/1991 |
| EP | 0 615 046 | 9/1994 |
| EP | 1 626 225 A2 | 2/2006 |
| EP | 3 477 037 | 5/2019 |
| GB | 1 390 259 A | 4/1975 |
| WO | 2017/037288 | 3/2017 |

OTHER PUBLICATIONS

International Search Report for PCT/EP2020/069353 dated Aug. 21, 2020, 5 pages with English Translation.
Written Opinion of the ISA for PCT/EP2020/069353 dated Aug. 21, 2020, 13 pages with English Translation.
Office Action issued in Chinese Patent Application No. 202080046373.6 dated Feb. 8, 2023.

* cited by examiner

METHOD AND DEVICE FOR FILLING HOLLOW PROFILE STRIPS

CROSS-REFERENCE TO RELATED APPLICATIONS

This application is the U.S. national phase of International Application No. PCT/EP2020/069353 filed Jul. 9, 2020 which designated the U.S. and claims priority to Austrian Patent Application No. A 255/2019 filed Jul. 11, 2019, the entire contents of each of which are hereby incorporated by reference.

BACKGROUND OF THE INVENTION

Field of the Invention

The invention relates to a method for filling hollow-section strips, in particular hollow-section strips that are legs of spacer frames or closed spacer frames, wherein free-flowing fill material from a storage tank, in particular a hygroscopic material, such as a molecular sieve, is introduced into the hollow-section strips.

The invention furthermore relates to a device with which the method according to the invention can be implemented.

Description of the Related Art

Methods and devices for filling hollow-section strips, in particular hollow-section strips that serve as spacers in insulating glass, are known in various embodiments.

A device for filling spacer frames for insulating glass with hygroscopic material is known from AT 383 581 B, wherein the spacer frames have corners that are produced in one piece by bending. The device comprises holders for the spacer frames that are to be filled and at least one multi-function tool, which has a device for making an opening in the outer wall of the spacer frame, a nozzle for pouring the hygroscopic material into the spacer frame, and a nozzle for closing the fill opening.

Another device for filling the spacer frames of insulating glass is known from AT 383 582 B. A device for filling spacer frames for insulating glass with hygroscopic granular material is described, in which the line that connects a storage tank to the outlet opening for the granular material has a section with a larger cross-section and a section with a smaller cross-section, which deflects upward and whose axis is offset upward relative to the axis of the section with a larger cross-section. This device is used, for example, in a machine for filling spacer frames for insulating glass, which has two operating arrangements, with which holes can be made in the legs of the spacer frame, granular material can be poured in, and the holes can be closed again. The operating arrangements have a plate, on which the respective leg of the spacer frame rests and in which a hole for the passage of a drill as well as the emptying points of the line for the granular material and a channel for closing material are arranged. In order to bring the legs of the spacer frame, which are gripped by clamping devices, sequentially into the alignment position with the hole for the drill and the emptying points for the channels, the clamping systems and the plate can be moved relative to one another.

Methods and devices for filling spacer frames with fill material (hygroscopic material, such as a molecular sieve) are known from AT 388 548 B, AT 390 606 B, EP 0 349 519 A1, and EP 0 376 926 A2.

A spacer frame that consists of a hollow-section strip that is bent three ways and is open at the fourth corner is known from DE 44 02 450 A1 (=EP 0 615 046 A2), wherein one leg is longer than the other leg that leads to the open corner and is filled with granular desiccant via a tube that is introduced into the leg. The tube projects with its front end to the desired fill level in the leg. As soon as the desiccant in the leg reaches the tube, the desiccant ceases to flow. A sensor detects this. The sensor triggers the extraction of the tube. In this case, underpressure is applied via a line to the tube, so that no more desiccant exits from the tube.

Known from EP 0 430 924 A1 (=AT 399 587 B) is a bulk-material flow detector for a line, through which granular, hygroscopic material that is to be poured into spacer frames for insulating glass is fed from a storage tank to a fill head. The bulk-material flow detector has a light source that is connected to the line, which light source emits a beam of light that crosses the line. The light source that is located in a facing position is arranged on the sensor that responds to light emitted from the light source. When acted upon by the light striking it from the light source, the sensor sends out a signal to a control unit that on the one hand sends out a signal if no signal is received by the sensor during a preselected time after the last signal that is sent out by the sensor.

Known from EP 3 477 037 A1 are a device and a method for filling a spacer frame leg or a spacer frame with hygroscopic fill material, wherein an indirect determination of the amount of the fill material poured into a spacer frame leg or a spacer frame is to be possible by determining the reduction in weight of a storage tank that is filled with fill material.

Known from WO 2017/037288 A1 is a device for filling a spacer frame with a filler for the production of an insulating glazing, wherein at least a) a time for filling the spacer frame is calculated, b) the spacer frame is inserted into a filling device with scales and a frame holder, wherein the spacer frame is suspended in suspension devices, c) the spacer frame is filled during the calculated filling time, and d) the spacer frame is weighed, and the degree of filling is determined. When the degree of filling is >90%, the filling of the spacer frame is completed.

Among the known measures for determining the degree of filling of hollow-section strips, in particular of spacer frames for insulating glass, digital balances are disadvantageous, since high-precision scales are necessary owing to the low specific weight of the usual fill material.

Weighing using precision scales is not always readily possible because of various influences in practical operation, in particular in units for producing insulating glass (dust, drafts, etc.).

Also, determining the degree of filling of a hollow-section strip, in particular of a spacer frame for insulating glass, using a tube that has to be plugged into the hollow-section strip, for example into the frame leg of a spacer frame, and then has to be extracted again, has turned out to be disadvantageous.

Owing to the presence of burrs in the interior of hollow-section strips, there is the danger that a complete filling of a hollow-section strip, in particular of a spacer frame, is not ensured.

SUMMARY OF THE INVENTION

The object of the invention is to indicate a method and a device for implementing the method, with which the filling of hollow-section strips, in particular of hollow-section strips that serve as spacers in insulating glass, is readily and reliably possible, wherein the desired degree of filling can be achieved in a simple way and reliably.

In the procedure according to the invention, the fill level of the fill material in the storage tank (storage device) is determined precisely before the beginning of the filling of the hollow-section strip, such as a spacer frame or a leg for a spacer frame. In this case, it is preferred that a constant (pneumatic) pressure be applied to the surface of the fill material flow in the storage tank via a piston. It is ensured by this pressure that a defined contact surface of the fill material is provided, which allows a precise detection of the fill level in the storage tank and its changes.

By removing fill material from the storage tank, a hollow-section strip is filled until the piston in the storage tank no longer moves. The decrease in volume of the fill material in the storage tank is determined by measuring the distance by which the piston has moved (travel difference ΔH). By comparing the threshold value for the degree of filling of the frame (the latter originates from the frame geometry) and the actual value of the reduction in volume of the fill material in the storage tank, the method according to the invention makes it possible to determine whether the actually desired degree of filling of the hollow-section strip, in particular of the spacer frame, was achieved.

In practice, in the method according to the invention, it is possible to proceed, for example, in such a way that a spacer frame is inserted below the filling device into a frame holder and suspended. Holes for filling the frame are then drilled. Finally, granular desiccant, which in this case is the fill material, is poured via the filling device with the storage tank.

In an embodiment of the invention, a line is provided that empties into the tank and that is connected to a vacuum pump. The underpressure, which is generated by the pump, supports the pouring of fill material into the storage tank or allows pouring to take place only when, for example, the storage tank is arranged higher than a supply container (barrel), from which fill material (such as desiccant) is to be poured into the storage tank.

For example, the precise fill level of the fill material in the storage tank is determined before the beginning of the filling of the spacer frame by a piston being applied at constant (pneumatic) pressure to the surface of the fill material flow in the storage tank. When fill material is drained from the storage tank and a hollow-section strip or a spacer frame is filled, the piston moves, since it follows the surface of fill material in the storage tank. As soon as the piston no longer moves, the hollow-section strip or the spacer frame is completely filled. The amount of the fill material that is poured into the spacer frames is determined by measuring the stroke of the piston (travel difference ΔH). From a comparison between threshold value and actual value, it is determined whether the desired degree of filling of the hollow-section strip of the spacer frame was actually achieved, so that a simple quality control is possible.

The amount of the fill material that is removed from the storage tank corresponds to the product that consists of the cross-sectional area of the storage tank (=surface area of the piston) and stroke (ΔH) of the piston.

In the invention, the amount of the fill material that is poured into a hollow-section strip is determined volumetrically—and not gravimetrically as in the state of the art.

This makes it possible, in a simple way, to set the degree of filling—i.e., how far the cavity in the hollow-section strip is filled—to the predetermined (preset) value. For example, with the invention, aside from (usual) degrees of filling of above 90%, other degrees of filling, such as 80%, 70%, etc., can also be achieved.

As soon as the spacer frame is filled up to the desired degree of filling, in particular completely (>90%), further pouring of fill material from the fill line extending from the outlet opening of the storage tank is interrupted. This makes it possible to easily close drill holes that serve as fill openings in the spacer frame.

When the fill line is an elastic hose at least in places, the fill line can be closed by applying compressed air in the manner of a pinch valve.

As an alternative, a line to which underpressure can be applied can be connected to the fill line, in particular in the area of its end that is connected to the hollow-section strip, so that additional outflowing of fill material is prevented. In addition, a closing pin that can be moved into a closing position can be assigned to the free end of the fill line.

In a preferred embodiment, there is play between the outside of the piston and the inside of the wall of the storage tank, so that the movements of the piston in the storage tank are not prevented/hampered by fine dust.

Within the framework of the invention, consideration is also given to using multiple filling devices in order to fill multiple spacer frames at the same time or to fill a spacer frame via multiple fill openings.

BRIEF DESCRIPTION OF THE DRAWINGS

Further details and features of the invention follow from the description below of preferred embodiments based on the drawings. Here.

DESCRIPTION OF THE PREFERRED EMBODIMENTS

Figures 1, 2:
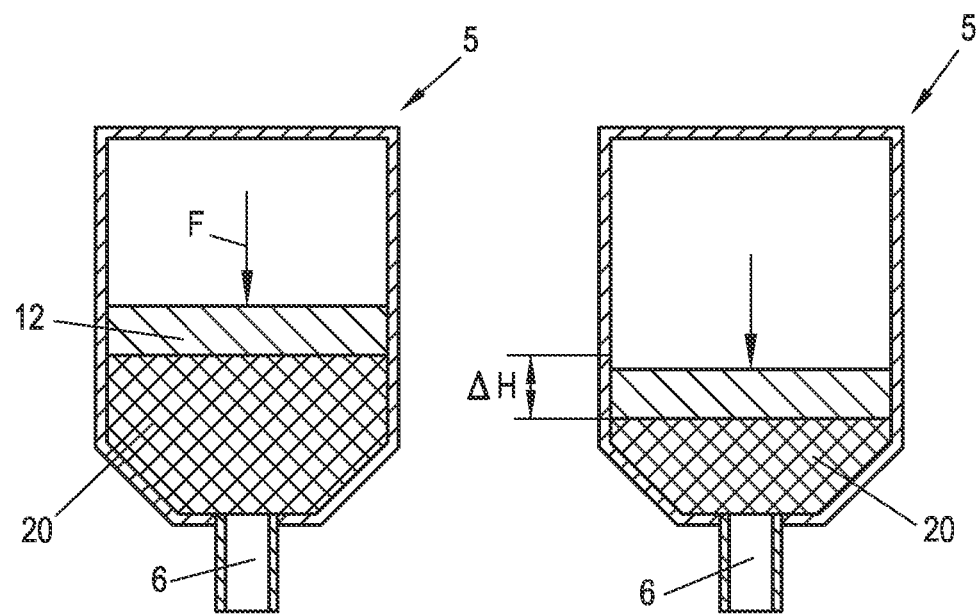
FIG. 1 shows diagrammatically a storage tank in the starting position.
FIG. 2 shows the storage tank from FIG. 1 after the filling of a spacer frame.

In a storage tank 5 that is shown diagrammatically in FIGS. 1 and 2, fill material 20 (e.g., desiccant in the form of a molecular sieve) is stored up, which is to be poured into a spacer frame 11 for insulating glass.

As shown in FIG. 1, a piston 12 rests on the top of the fill material 20, which piston is pressed with a preset force F on the surface of the fill material 20.

After a spacer frame 11 is filled, the piston 12 has been moved downward by the distance ΔH (FIG. 2). The amount of the fill material 20 (e.g., molecular sieve) that is actually introduced into the spacer frame 11 can be determined from the distance ΔH, by which the piston 12 has been moved, and the surface area of the piston 2.

To this end, it can be provided, for example, that the stroke of the piston 12, i.e., the distance ΔH, is detected using a measuring system, as will be further described below.

Figure 3:
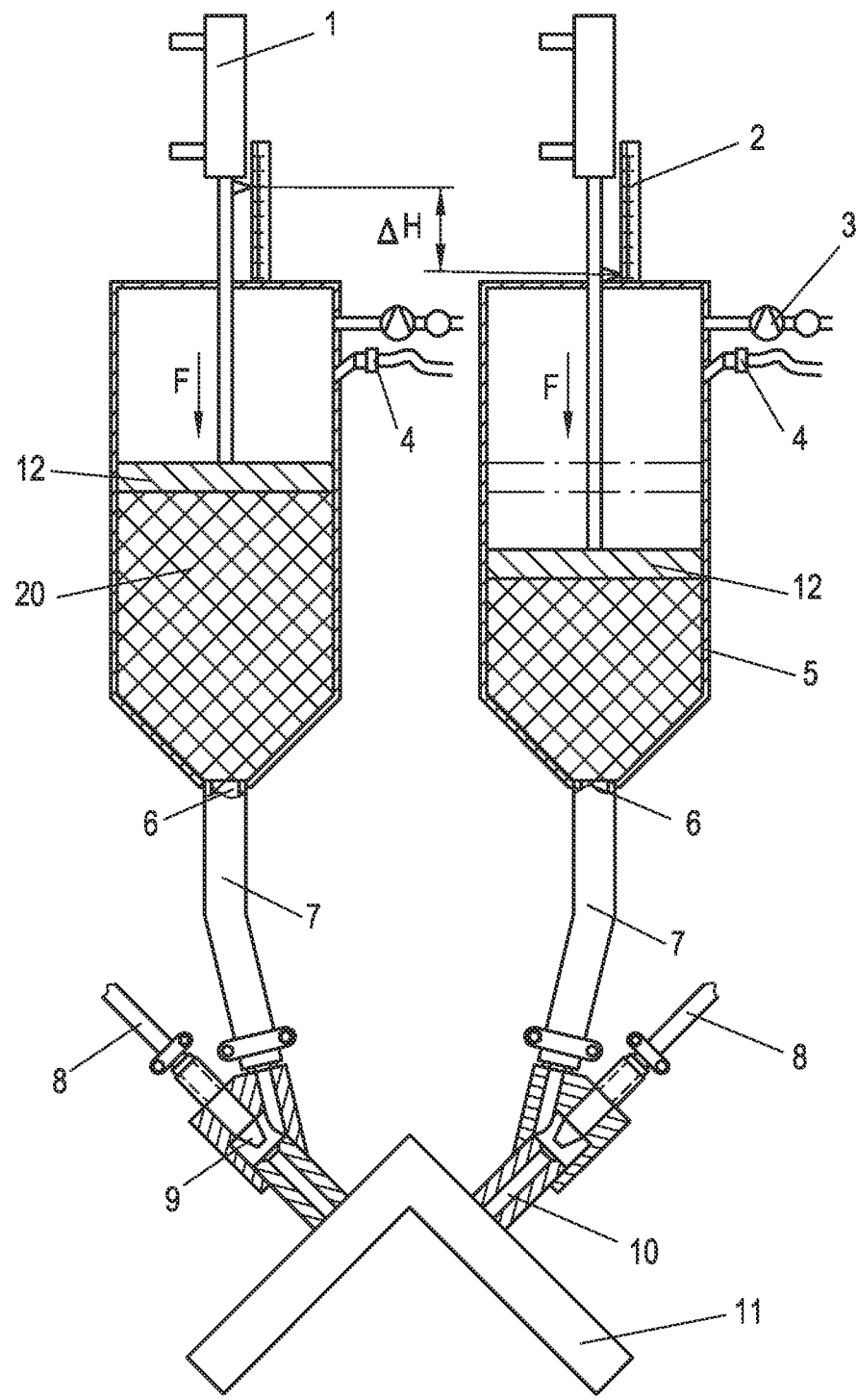
FIG. 3 shows a unit for implementing the method according to the invention.

In the unit (device) for filling a spacer frame 11 that is shown in FIG. 3, two storage tanks 5 are provided. In each of the storage tanks 5, a piston 12 is provided, which piston is pressed onto the top of the fill material 20. To this end, the piston 12 is connected to a piston rod of a pneumatic cylinder 1, so that the piston 12 is pressed onto the fill material 20 in the storage tank 5.

In order to detect the travel distance (Δ H) by which the piston 12 is moved when fill material 20 is removed from the storage tanks 5, a measuring guide 2 is provided. Instead of a measuring guide 2, any system can be provided that directly or indirectly detects the movements of the piston.

Lines are connected to the storage tank 5, which lines lead to a vacuum pump 3, so that underpressure can be generated in the storage tanks 5. This underpressure facilitates the feeding of fill material 20 (in particular free-flowing or pourable granular material in the form of a hygroscopic substance, such as a molecular sieve) via a line 4.

In the storage tanks 5, an outlet opening 6 is provided below, to which opening a line 7 in the form of a hose is connected. Fill material 20 is introduced into a spacer frame 11 through the line 7, by the line 7 being introduced into fill openings, which were generated previously in the outer wall of a spacer frame 11 that consists of hollow-section strips or a hollow-section strip that is bent to form a frame. The free end 10 of the line 7 can be closed using a nozzle 9 in the manner of a pinch valve, when compressed air is fed to the nozzle 9 via a compressed air hose 8. The line 7 can thus be closed if the filling of a spacer frame 11 was completed. This makes it possible to remove the spacer frame 11 and to close the openings in the spacer frame 11 by introducing a plastic, hardening material.

Figure 4:
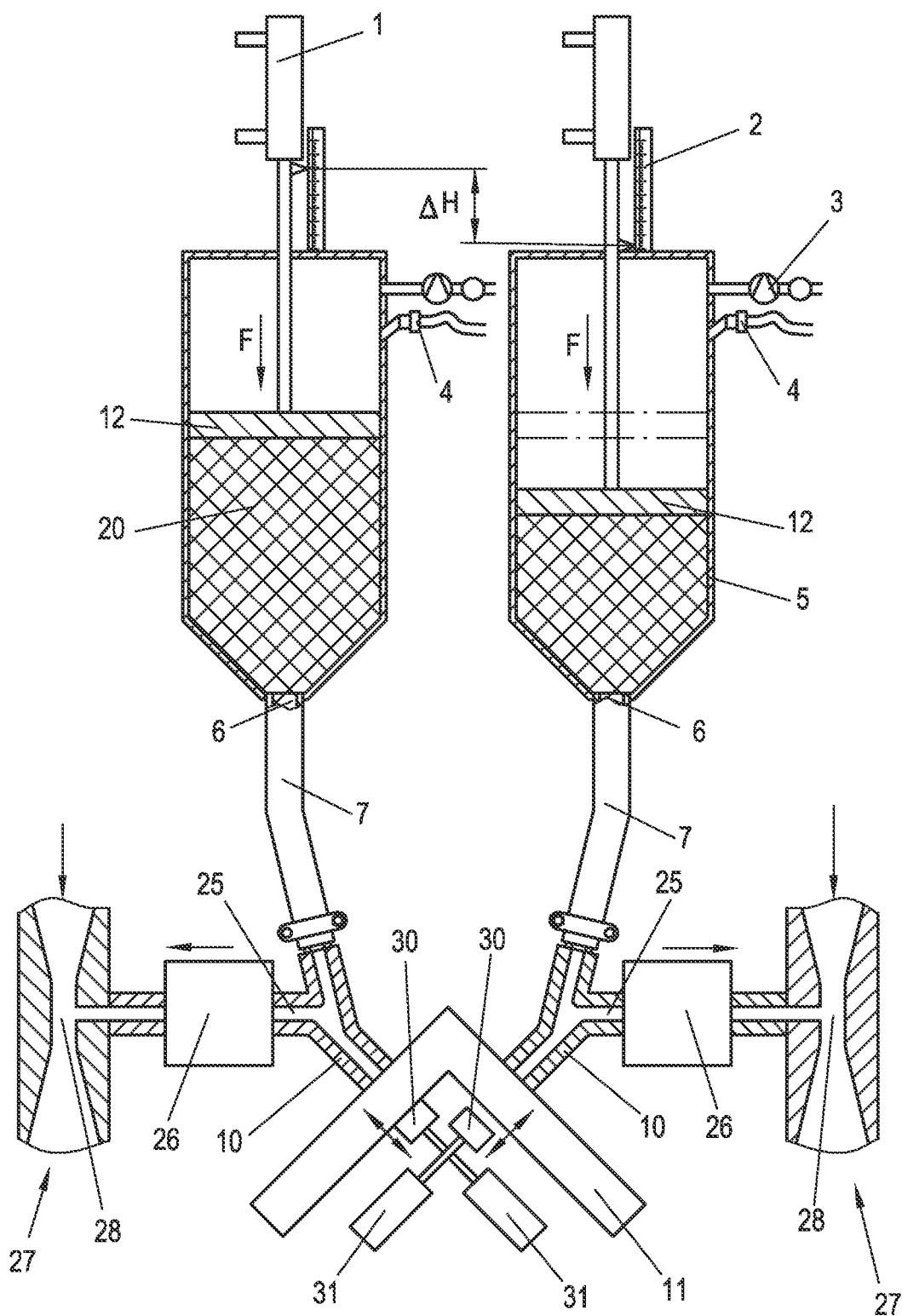
FIG. 4 shows another unit for implementing the method according to the invention.

The embodiment, shown in FIG. 4, of a unit for implementing the method according to the invention corresponds except for the difference, cited below, of the embodiment shown in FIG. 3.

Underpressure lines 25 extend from the lines 7 in the area of their free ends 10, which when spacer frames 11 are used for filling, are connected to the latter. Filters 26 are provided in the underpressure lines 25. The underpressure lines 25 are connected to—shown only symbolically in FIG. 4—jet pumps 27 in the area of bottlenecks 28. In the medium (for example, air) that flows through the jet pumps 27, underpressure is produced in the area of the bottleneck 28, which keeps fill material 20 (desiccant) from exiting from the free ends of the lines 7. As soon as this is achieved, the spacer frame 11 can be removed from the unit. In addition, fill material 20 is prevented from exiting from the lines 7 by closing pins 30 when the latter have been moved by their drives 31 into their closing position, in which they rest on the ends 10 of the lines 7.

In summary, an embodiment of the invention can be described as follows:

A device for filling spacer frames 11 that consist of hollow-section strips has a storage tank 5 for free-flowing, hygroscopic fill material 20, such as a molecular sieve. A line 7 that leads to the spacer frame 11 that is to be filled extends from the storage tank 5 and empties into a fill opening in the wall of the spacer frame 11. The amount of the fill material 20 that is poured into the spacer frame 11 is determined by the amount of the fill material 20 removed from the storage tank 5 being detected. The amount of the fill material 20 removed from the storage tank 5 is detected by measuring the travel (ΔH) of a piston 12 that rests with pressure on the fill material 20 in the storage tank 5. The degree of filling is verified by the amount of the fill material 20 removed from the storage tank 5 being compared to the preset amount of the fill material 20 that is to be poured into the spacer frame 11.

The invention claimed is:

1. Method for filling hollow-section strips, wherein free-flowing fill material is introduced from a storage tank into the hollow-section strips, the method comprising detecting the amount of the fill material that is introduced into the hollow-section strips by detecting the amount of the fill material removed from the storage tank;
   wherein pressure is exerted on the top of the fill material contained in the storage tank using a piston that can move in the storage tank; and
   wherein the drop in the level of fill material in the storage tank is determined by detecting the travel of the piston in the storage tank.

2. The method according to claim 1, wherein the piston is loaded pneumatically.

3. The method according to claim 1, wherein the degree of filling of the hollow-section strip is verified by a calculated threshold value for the degree of filling of the hollow-section strip being compared to the amount of the fill material removed from the storage tank as an actual value.

4. The method according to claim 1, wherein underpressure is generated in the storage tank in order to suction off fill material in the storage tank.

5. The method according to claim 1, wherein fill material is prevented from exiting from the outlet opening after the filling process is completed by closing the lines in the manner of a pinch valve.

6. Device for implementing a method for filling hollow-section strips, wherein free-flowing fill material is introduced from a storage tank into the hollow-section strips, the method comprising detecting the amount of the fill material that is introduced into the hollow-section strips by detecting the amount of the fill material removed from the storage tank, said device comprising a storage tank for fill material, a piston that can move in the storage tank, a system for loading the piston with a preset pressure, line, which connects the storage tank to the hollow-section strip that is to be filled, and a system for detecting the travel distance that pushes the piston back in the storage tank when fill material is removed.

7. The device according to claim 6, wherein a line to which underpressure can be applied is connected to the storage tank for generating underpressure in the storage tank.

8. The device according to claim 6, wherein a line is connected to the outlet opening of the storage tank and in that the line is assigned to a shut-off valve.

9. The device according to claim 6, wherein there is play between the piston and the inside of the wall of the storage tank.

10. The device according to claim 6, wherein the piston stops when the actual amount of the fill material has been poured into the hollow-section strip.

11. The device according to claim 6, wherein the system for detecting the travel distance, by which the piston is moved in the storage tank, is a measuring guide.

12. The device according to claim 6, wherein the line, which runs from the storage tank to the hollow-section strip that is to be filled is a flexible hose, and wherein the free end of the fill line can be closed in the manner of a pinch valve.

13. The device according to claim 12, wherein a nozzle to which compressed air can be applied is provided in order to close the line in the manner of a pinch valve.

14. The device according to claim 6, wherein an underpressure line is connected to the line, which underpressure line runs to a source for underpressure.

15. The device according to claim 14, wherein a filter is provided in the underpressure line.

16. The device according to claim 6, wherein two storage tanks are provided that are connected in parallel and wherein a line for filling a spacer frame extends from each storage tank.

* * * * *